F. P. FAY.
EXERCISER.
APPLICATION FILED JUNE 8, 1909.
938,045.
Patented Oct. 26, 1909.
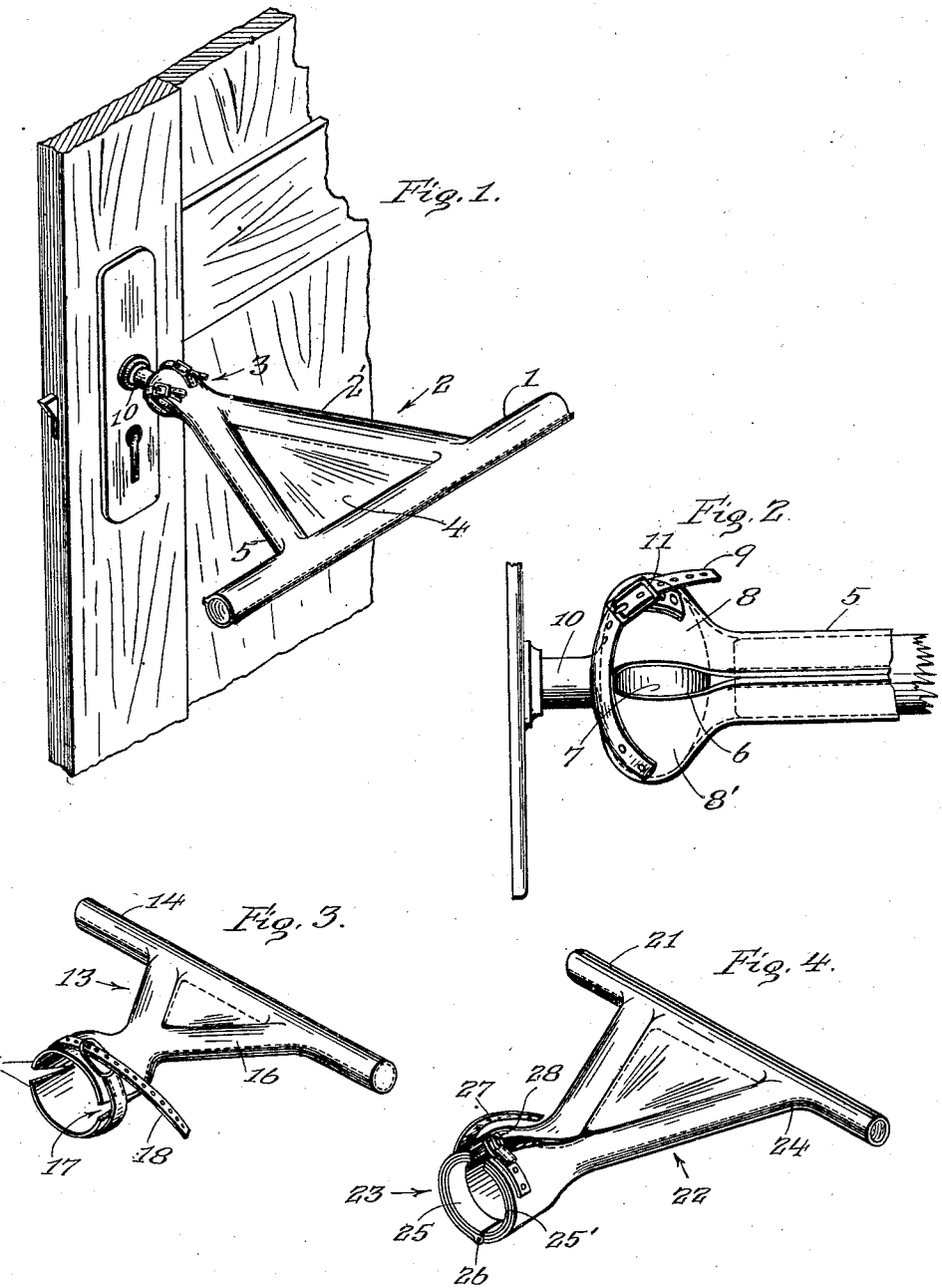
Witnesses.
Geo. J. Huting.
Louis W. Gratz.
Inventor:
Frank P. Fay.
by Townsend Lyon & Haesley
His Attys

UNITED STATES PATENT OFFICE.

FRANK P. FAY, OF LOS ANGELES, CALIFORNIA.

EXERCISER.

938,045.  Specification of Letters Patent.  Patented Oct. 26, 1909.

Application filed June 8, 1909. Serial No. 500,959.

*To all whom it may concern:*

Be it known that I, FRANK P. FAY, a citizen of the United States, residing at Los Angeles, in the county of Los Angeles and State of California, have invented a new and useful Exerciser, of which the following is a specification.

This invention relates to an exerciser particularly adapted for office or home use, and the main object of the invention is to provide a device which can be readily applied to any suitable support such as a door knob and can be used to give a variety of exercises to the human body, particularly the arms and wrists.

Other objects and advantages will be brought out in the following description.

The accompanying drawings illustrate the invention, and referring thereto:—Figure 1 is a perspective of the exerciser in place on a door knob. Fig. 2 is a side elevation of the attaching means for the exerciser showing the manner of attachment to a knob. Figs. 3 and 4 are perspectives of different forms of the invention.

Referring to Fig. 1, the exerciser comprises a handle member 1 formed as a bar, a shank member 2 extending therefrom and attaching means or socket 3 at the end of the shank member and constructed to grip or embrace a door knob or other suitable support, said support being mounted to rotate on a horizontal axis and having an enlargement for attachment of the handle member. The bar or handle 1 extends transversely to the axis of rotation of the support. The shank member 2 may be formed as a triangular member having side bars 2' connected at their outer ends to the bar 1 and connected together at their inner ends, these bars 2', as well as the bar 1, being preferably covered with leather or other suitable covering which may extend in a web 4 in the triangle between the bars 2' and 1.

The attaching means or socket 3 is preferably formed as a continuation or extension of the leather covering 5, this extended portion of the covering being separated or split as at 6 to form upper and lower portions 8, 8' which slip over or pass around the door knob indicated at 7, these upper and lower portions 8 being bent or shaped to conform more or less to the shape of the knob 7. A strap 9 is attached to one of the members 8 at each side of the shank 10 of the door knob and a buckle 11 is provided for attaching said strap adjustably to the other member 8' so that by tightening said strap in said buckle, the members 8, 8' are caused to grip the door knob tightly between them and to thereby clamp the exerciser to the knob.

In using the device the handle 1 is grasped by both hands and can then be moved in various directions, upwardly, downwardly, to either side, or rotatably, this rotative or twisting action being particularly effective.

Any suitable clamping means may be used for attaching the inner end of the exerciser to the knob, for example, the forms shown in Figs. 3 and 4. In Fig. 3, the shank 13 of the handle member 14 is provided with cup portions 15 formed, for example, of the leather covering 16 of the device, said cup portions 15 being split or separated as at 17 and being adapted to embrace the knob, and a binding strap 18 being provided, said strap being attached to one of said members and being of sufficient length to extend completely around the other of said members 15 at the inside of the door knob to constrict or bind the two members onto the door knob.

In Fig. 4, the shank 22 of the handle member 21 is provided with an enlargement or cup 23 at its inner end formed from the leather covering 24 of the exerciser and at the inner end of the said cup is provided a split ring hinged at 26. The two members 25, 25' of the split ring are provided, respectively, with a strap 27 and buckle 28 at their free ends to enable them to be fastened together. The said split ring is preferably of metal or other unyielding material and is sufficiently small to engage back of the door knob when closed by the strap and buckle means 27, 28 to hold the exerciser on the door knob.

All of the above devices may be used in substantially the same manner as above described and in each case the device is of especial advantage when used with a door knob, as the rotatability of the door knob permits of twisting or rotative movements which would not otherwise be practicable.

What I claim is:—

1. An exerciser comprising a handle member, a shank, a clamping means on the shank formed with a socket to engage over a door knob, and fastening means connected to said clamping means at the inner end thereof to extend back of the knob and hold the device in position on the knob.

2. An exerciser comprising a handle member, a shank connected thereto, a socket connected to said shank and comprising members adapted to embrace a knob, and fastening means connected to said members for retaining the socket on the knob.

3. An exerciser comprising a handle member, a shank connected thereto, a socket connected to said shank and comprising members adapted to embrace a knob, fastening means connected to said members for retaining the socket on the knob, said socket being split, and said fastening means comprising strap and buckle means for closing the split of the socket.

In testimony whereof, I have hereunto set my hand at Los Angeles, California this 2nd day of June 1909.

FRANK P. FAY.

In presence of—
 Geo. V. Horr,
 Fred N. Bronson.